Patented Apr. 13, 1943

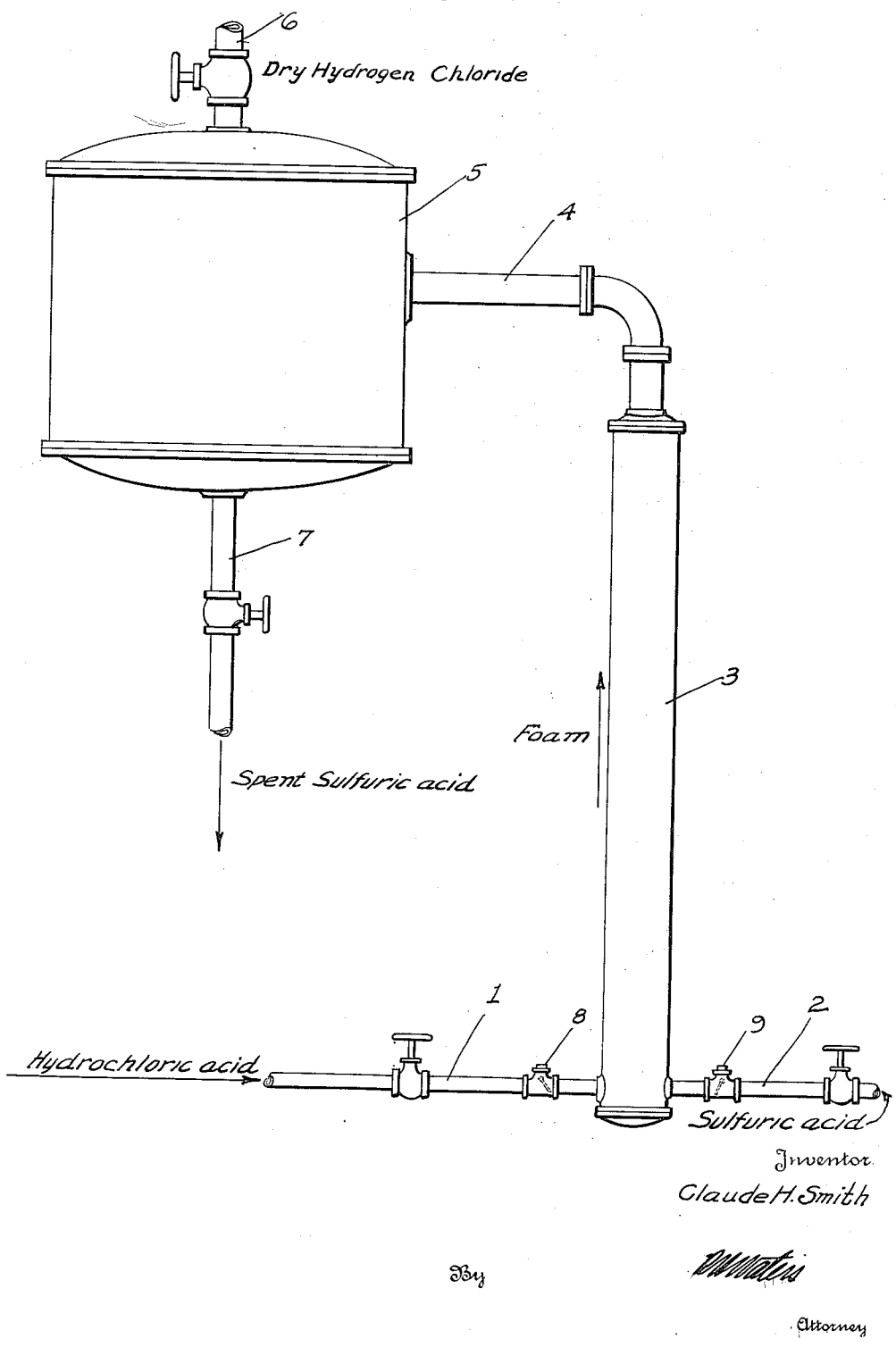

2,316,633

UNITED STATES PATENT OFFICE 2,316,633

PRODUCTION OF HYDROGEN CHLORIDE

Claude H. Smith, Talmadge, Ohio, assignor to Wingfoot Corporation, Wilmington, Del., a corporation of Delaware Application April 5, 1941, Serial No. 387,049

2 Claims. (Cl. 202—57)

This invention relates to the production of hydrogen chloride and more particularly to the production of dry hydrogen chloride gas by reacting hydrochloric acid with concentrated sulfuric acid.

In many industrial processes, it is desirable to utilize hydrogen chloride in the form of a dry gas rather than in the form of an aqueous solution such as hydrochloric or muriatic acid. One method for preparing hydrogen chloride gas is to mix hydrochloric or muriatic acid with concentrated sulfuric acid. The sulfuric acid abstracts the water from the muriatic acid and releases the hydrogen chloride in dry, gaseous form. In practice, considerable care has to be exercised in carrying out this reaction to insure uniform and complete reaction and to prevent the spray and foam ordinarily produced from being carried out of the reactor along with the hydrogen chloride gas. Furthermore, if the process is carried out continuously, if it necessary to draw off the spent sulfuric acid and unless good mixing is obtained, it may be necessary to use large excesses of sulfuric acid in order to insure efficient absorption of water and complete utilization of the hydrochloric acid. It is obvious that mechanical agitation is difficult in such an acid mixture.

According to the present invention, dry hydrogen chloride gas may be produced simply and economically with good mixing and efficient utilization of the reactants. The description of the invention will be facilitated by reference to the attached drawing, which is a semi-diagrammatical elevation of apparatus suitable for use in the practice of the invention.

Referring to the drawing, hydrochloric acid and concentrated sulfuric acid are separately fed through lines 1 and 2 respectively into the bottom of a reactor 3. The two acids mix in the bottom of the reactor and react with considerable vigor and the production of heat, and with the attendant formation of a voluminous foam which consists of dry hydrogen chloride gas, spent sulfuric acid and a minor proportion of unreacted hydrochloric acid and concentrated sulfuric acid. The volume of the foam produced is roughly ten times that of the hydrochloric acid employed. The foam rises through the reactor 3, which is filled with suitable packing such as tile, pumice or the like and, in its passage through this packing, is thoroughly agitated and mixed so that the reaction proceeds substantially to completion. Although the foam is relatively unstable, it passes through this packed column without substantial breaking. If any slight breaking of the foam does occur, the condensed liquids are swept on by the fresh oncoming gas and foam, possibly with some attendant airlift effect. The foam then passes out of the top of the reactor 3 and is led through a pipe 4 into a foam separator 5 which, in order to function efficiently, should have a larger volume than the free space of the packed column 3 so that on passing into the separator 5 the foam, being substantially completely reacted, will expand and break rapidly, releasing the dry hydrogen chloride to pass from the top of the separator through pipe 6 and the spent sulfuric acid to collect in the bottom of the separator and be withdrawn through the pipe 7. Since in practice the apparatus will ordinarily be operated under some pressure, it is desirable as a safety feature to have check valves 8 and 9 in the acid feed lines 1 and 2 to prevent any backfiring from the reactor into the feed lines in the event that abnormal pressures are built up in the system by any means.

From the foregoing description, it will be observed that the process of the invention is very simple and easy to operate. The starting materials are fed into the bottom of the reactor and the reaction mixture, product and spent acid are all carried concurrently through the reactor and into the separator. During continuous operation, no drain is necessary in the bottom of the reactor to remove spent acid, although such a drain may be provided for cleaning or draining the reactor when it is shut down. Since the spent acid is carried along with the product, the process is self-regulatory and there is no necessity to control the rate of withdrawal of the spent acid in relation to the rate of introduction of the starting materials.

The various parts of the equipment should be constructed from materials which are resistant to the acids with which they are in contact. The reactor is conveniently constructed from commercially available stoneware pipe. Nor does this pipe have to be of abnormally large dimensions. The efficiency of the process is such that a reactor with a 6 inch inside diameter and 5 ft. long can be used to produce about 75 pounds of dry hydrogen chloride gas per hour. Various types of acid-resistant packing may be employed in the reactor, the size and design of the packing being chosen so as to insure good mixing of the foam. The reactor may be packed throughout its entire length or, if desired, a space may be left at the bottom for initial mixing of the starting materials.

Considerable heat is generated in the reaction but release of the hydrogen chloride is facilitated if a small amount of external heat is supplied to the system. This may be done conveniently by heating one or both of the starting acids before introducing them into the reactor.

I claim:

1. A process for continuously producing dry hydrogen chloride which comprises introducing hydrochloric acid and concentrated sulfuric acid into a vessel, reacting them with abstraction of the water from the hydrochloric acid by the sulfuric acid and with the formation of a foam consisting of the reaction mixture, product and spent sulfuric acid, concurrently passing the mixture composing the foam through a packed chamber into a separator, separating the dry hydrogen chloride from the diluted sulfuric acid and individually drawing off the dry hydrogen chloride and diluted sulfuric acid.

2. A process for continuously producing dry hydrogen chloride which comprises introducing hydrochloric acid and concentrated sulfuric acid into a vessel, reacting them with abstraction of the water from the hydrochloric acid by the sulfuric acid and with the formation of a foam consisting of the reaction mixture, product and spent sulfuric acid, concurrently passing the mixture composing the foam upwardly through a packed chamber into a separator, separating the dry hydrogen chloride from the diluted sulfuric acid and individually drawing off the dry hydrogen chloride and diluted sulfuric acid.

CLAUDE H. SMITH.

---

CERTIFICATE OF CORRECTION.

Patent No. 2,316,633. April 13, 1943.

CLAUDE H. SMITH.

It is hereby certified that error appears in the printed specification of the above numbered patent requiring correction as follows: Page 1, first column, line 21, for "if it" read --it is--; at the top of the drawing in a position adjacent to the outlet pipe 6 and the legend "dry hydrogen chloride" insert a vertical arrow pointing upward; and that the said Letters Patent should be read with this correction therein that the same may conform to the record of the case in the Patent Office.

Signed and sealed this 15th day of June, A. D. 1943.

(Seal)

Henry Van Arsdale,
Acting Commissioner of Patents.

CERTIFICATE OF CORRECTION.

Patent No. 2,316,633.　　　　　　　　　　　　　　　　April 13, 1943.

CLAUDE H. SMITH.

It is hereby certified that error appears in the printed specification of the above numbered patent requiring correction as follows: Page 1, first column, line 21, for "if it" read --it is--; at the top of the drawing in a position adjacent to the outlet pipe 6 and the legend "dry hydrogen chloride" insert a vertical arrow pointing upward; and that the said Letters Patent should be read with this correction therein that the same may conform to the record of the case in the Patent Office.

Signed and sealed this 15th day of June, A. D. 1943.

(Seal)　　　　　　　　　　　　　　　　　　　　　　Henry Van Arsdale,
　　　　　　　　　　　　　　　　　　　　　Acting Commissioner of Patents.